United States Patent
Kampmann et al.

(10) Patent No.: US 8,565,083 B2
(45) Date of Patent: Oct. 22, 2013

(54) THINNING OF PACKET-SWITCHED VIDEO DATA

(75) Inventors: Markus Kampmann, Aachen (DE); Thomas Rusert, Kista (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 214 days.

(21) Appl. No.: 13/055,325

(22) PCT Filed: Jul. 25, 2008

(86) PCT No.: PCT/EP2008/059793
§ 371 (c)(1),
(2), (4) Date: Mar. 9, 2011

(87) PCT Pub. No.: WO2010/009768
PCT Pub. Date: Jan. 28, 2010

(65) Prior Publication Data
US 2011/0170447 A1 Jul. 14, 2011

(51) Int. Cl.
*H04L 1/00* (2006.01)
(52) U.S. Cl.
USPC ...................................................... 370/230.1
(58) Field of Classification Search
USPC ................. 370/229–235, 252, 389, 394, 370/395.5–395.52, 473–474; 375/240, 375/240.12–240.16
See application file for complete search history.

(56) References Cited

U.S. PATENT DOCUMENTS

| | | | | |
|---|---|---|---|---|
| 5,392,396 | A * | 2/1995 | MacInnis | 345/543 |
| 7,571,246 | B2 * | 8/2009 | Virdi et al. | 709/232 |
| 7,706,384 | B2 * | 4/2010 | van Beek | 370/395.4 |
| 7,848,237 | B2 * | 12/2010 | Todd et al. | 370/235 |
| 2006/0184790 | A1 | 8/2006 | Oliveira et al. | |
| 2007/0276954 | A1 | 11/2007 | Chan et al. | |

OTHER PUBLICATIONS

Huo et al, Network Adapted Selective Frame-Dropping Algorithm for Streaming Media, IEEE, 7 pages, 2007.*
Dimitriou, S. et al. "A New Service Differentiation Scheme: Size Based Treatment." 2008 IEEE International Conference on Telecommunications, Piscataway, NJ, USA, Jun. 16, 2008.
Chebrolu, K. et al. "Selective Frame Discard for Interactive Video." 2004 IEEE International Conference on Communications, Paris, France, Jun. 20-24, 2004.

* cited by examiner

*Primary Examiner* — Frank Duong
(74) *Attorney, Agent, or Firm* — Coats & Bennett, P.L.L.C.

(57) ABSTRACT

This invention relates to a method and to a system for thinning a stream of packet-switched video data in which a stream of packet-switched video data is detected and the size of the packets in the video stream is determined, wherein packets of the video stream data are dropped depending on the size of the packets.

15 Claims, 4 Drawing Sheets

THINNING OF PACKET-SWITCHED VIDEO DATA

TECHNICAL FIELD

The present invention relates to a method for sending a stream of packet-switched video data and to a digital video processing unit for sending the video data.

BACKGROUND

Multimedia streaming is a major application in the internet and for 3G networks, and a packet-switched streaming service has been standardized in 3GPP allowing to stream audio and video data to handhelds. In another context, streaming is used for the realization of mobile TV services.

Within a packet-switched streaming service, a streaming server transmits packets over a network to a streaming client. Another example of transmitting packets over a network such as the Internet is progressive download. Often these packets also pass intermediate nodes like proxies. Adaptive streaming enables a streaming service to adapt to varying network conditions. This is necessary because, for a continuous play out of a media stream, the transport network has to provide throughput which is at least as high as the rate of the encoded content. Although best effort networks can often provide the required bit rate, they cannot guarantee availability of the required bit rate during the whole lifetime of the session. In particular, mobile links are often characterized by a varying throughput due to the nature of the wireless channel.

In case the transport network can only provide a bit rate that is lower than the content rate, i.e. in the case of insufficient bandwidth, not all packets of the packet-switched video data can be transmitted. In this case, some packets have to be dropped. This dropping of packets, also called thinning, can be done either at the server or at the proxy.

Often, the selection of the dropped packets is done randomly. In this case, large degradations of the stream media quality can be expected, since it is likely that packets with large impact on the overall media quality will be dropped.

Another possibility to select a packet to be dropped is based on the importance of a packet towards the overall media quality.

As the frames are normally compressed using video compression frames of the video stream with a varying size of compressed data are known. A frame is essentially a picture captured at a predetermined instant in time, the set of frames building the video stream. In typical video coding schemes, such as an MPEG coded video stream, a GOP (Group of Pictures) is a group of successive pictures within the video stream. Each MPEG coded video stream consists of successive GOPs. A GOP can contain the following frame types:

I frame (intra-coded frame): a frame corresponding to a fixed image which is independent of other frames. Each GOP begins with this type of frame.

P frame (predictive coded frame): contains motion compensated difference information relative to previously coded frames, using up to 1 reference frame for prediction. Normally, P frames need much less storing space than I frames.

B frame (bidirectional predictive coded frame): contains motion compensated difference information relative to previously coded frames, using up to 2 reference frames for prediction. Normally, B frames need less storing space than I frames or P frames.

One way of the selection of the packets to be dropped is based on the importance of the packet towards the overall media quality. In case of video encoded using sequential prediction structures (e.g. a structure such as IPPP) or structures with non-referenced B frames (IBP or IBBP), a packet belonging to an I frame is more important than a packet belong to a P frame or even a B frame. Furthermore, the importance of a P frame depends on its position in the GOP. By way of example, a P frame just before an I frame is less important than another one appearing earlier in the GOP. For hierarchical prediction structures (hierarchical B frames) the importance of a video frame increases with the number of pictures that depend on that frame. Exploiting such knowledge for video thinning at a server or proxy is only possible if the packet's corresponding frame type or position within a GOP is known. This knowledge has either to be stored at the dropping node or has to be extracted from the stream by checking the payload.

However, this knowledge is often not available, especially in case the proxy is carrying out the frame dropping. An a priori knowledge of the stream is not available. In case of an encrypted video, a check of the payload is not possible. In the case of a non-encrypted video, a payload check is often not feasible since the complexity of the proxy and processing time is increasing too much.

SUMMARY

Accordingly, it is an object of the present invention to provide an effective way of thinning a packet-switched video stream. This object is achieved by the features of the independent claims. In the dependent claims, preferred embodiments of the invention are described.

According to a first aspect of the invention, a method for sending a video stream of packet-switched video data is provided in which said stream of packet-switched video data is detected and the size of the packets in the video stream is determined. The decision which of the packets of the stream of video data is dropped for thinning the stream is based on the size of the packets. In case of video coding, the encoding of I frames needs normally more bits than the encoding of P frames and this more than the encoding of B frames. Therefore, in case of one to one mapping of encoded frames onto packets, packets belonging to I frames have a larger size than packets belonging to P frames. In the case that an I frame exceeds the maximum allowed packet size, it is split into two or more packets where all but the last packet have the maximum allowed packet size. The same situation could occur for P frames, especially in the case of a scene cut. When a scene cut occurs in a movie, the difference information to be coded in the P frame can have a size larger than the maximum allowed packet size. In this situation also a P frame may be split into two or more packets. For hierarchical B frame prediction structures, I frames and P frames are typically encoded using higher fidelity than B frames, and the encoding fidelity of the B frames typically depends on the number of frames that depend on this B frame. Therefore, the number of bits needed to encode a frame in such a GOP structure usually increases with the number of dependent frames. Accordingly, by dropping packets depending on the size of the packets, the packets least influencing the overall media quality can be easily detected and dropped in case a thinning of the stream is necessary in view of the available bandwidth.

In the simplest embodiment of the invention, small packets are dropped first and larger packets are dropped last.

According to one embodiment of the invention, the maximum packet size of the packets in the video stream is determined or the frame structure of the group of pictures GOP. With the maximum packet size known or with the frame structure known, it is possible to enhance the dropping mechanism taking into account the maximum packet size and/or the structure of the GOP. In one embodiment, the frame structure of the group of pictures contained in the stream of video data can be determined considering the size of the packets. By way of example when packets with the maximum packet size are detected in constant intervals, the position of I frames in the dataflow can be deduced.

For determining the importance of a B frame it may be necessary to detect a hierarchical prediction structure for B frames contained in the video stream, this hierarchical structure providing information about the importance of a frame for other frames. The dropping can then be carried out by dropping less important B frames first.

In another embodiment of the invention, when it has to be determined whether an investigated packet is to be dropped or not, the size of a packet preceding the investigated packet is determined and the investigated packet is dropped depending on the size of the packet preceding the investigated packet. In case an I frame is divided into several packets, the last packet of this I frame could be of small size. The above-mentioned investigation of the preceding packet helps to avoid that a part of an I frame is dropped. If the preceding packet is a large packet, e.g. a packet having the maximum packet size, a dropping is not carried out as in this case this small packet belongs to an I frame. Accordingly, the investigated packet is dropped if the size of the packet preceding the investigated packet is smaller than a predetermined threshold. Another possibility to detect an I frame with a small packet size is to check a marker bit in a real time transport protocol header (RTP header). The marker bit indicates whether a packet is the last packet of a video frame. In case the marker bit of the preceding packet is not set and the marker bit of the investigated packet is set, dropping is not carried out and the next smallest packet is checked.

Another embodiment is to drop packets sent before large packets. This can be achieved by detecting packets larger than a predetermined threshold, the packets preceding the packet being larger than said predetermined threshold being dropped first. In other words, an investigated packet is dropped if the successive packet is larger than or equal to a predetermined threshold. This algorithm helps to consider the fact that the importance of a P frame depends on its position in the GOP whereas a P frame just before an I frame is less important than another one appearing earlier in the GOP. Furthermore, packets preceding a packet having the maximum packet size might be dropped first. Furthermore, it is possible to detect the I frames present in the GOP and to drop the packets just before the I frames. The predetermined threshold for the above-discussed examples can be the maximum packet size.

Embodiments of the invention further include a digital video processing unit for thinning a stream of packet-switched video data, the processing unit comprising a media type detector detecting said stream of packet-switched video data. Furthermore, a thinning unit is provided determining which of the packets of the video stream are dropped wherein the thinning unit determines the size of the packets in the stream of video data and drops packets of the stream of video data depending on the size of the video packets. Furthermore, a maximum packet size detector may be provided detecting the maximum size of the packets in the video data stream. In addition to a buffer may be provided where the packets to be investigated can be buffered or in which all the packets to be investigated can be buffered. A structure detector may be provided detecting the frame structure of the GOP. In an improved thinning, the thinning unit additionally takes into account the GOP structure determined by the structure detector in order to select the packets to be dropped. The structure detector is looking for a regular GOP structure meaning that it looks for I frames that are inserted in the video stream at a fixed temporal distance. Preferably, the thinning unit is configured in such a way that the packet to be dropped is selected as was discussed in more detail above meaning that the smallest packets are dropped first or that it is first investigated whether the small packet is part of an I frame etc.

BRIEF DESCRIPTION OF THE DRAWINGS

In the following the invention will be described in further detail below with reference to the accompanying drawings, in which.

DETAILED DESCRIPTION OF PREFERRED EMBODIMENTS

Figure 1:
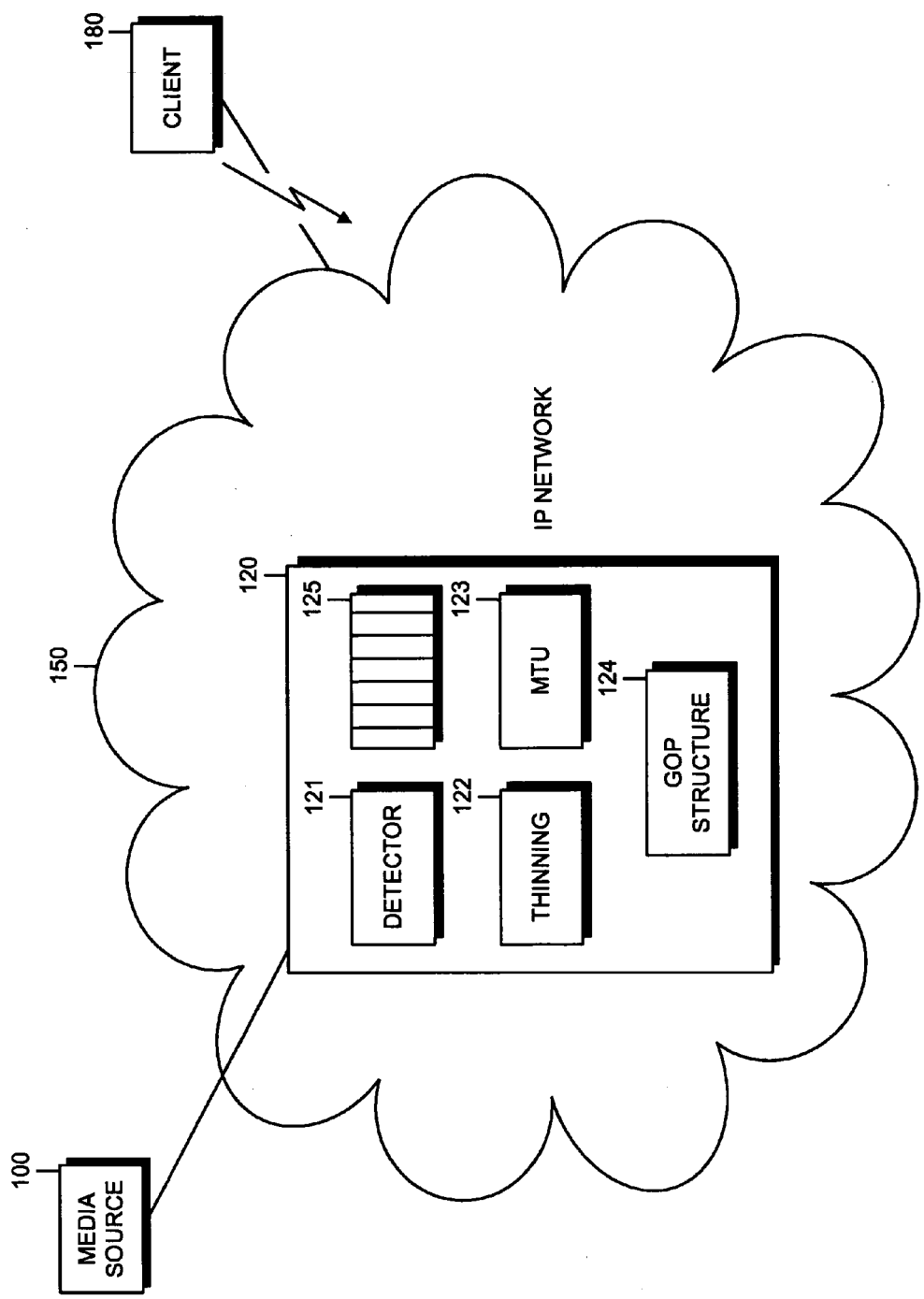
FIG. 1 is a schematic view of a media stream streamed over a mobile network to a client using a digital video processing unit for thinning the video stream.

In FIG. 1, a system that can be used for an end to end streaming and download of multimedia data is shown. The multimedia file comprising video and optionally audio data is stored in a media source or server 100 from where it is streamed over an IP network 150 to a client terminal 180. In the embodiment shown, a digital video processing unit 120 is shown contained in the IP network, e.g. at a proxy. However, it should be understood that the digital video processing unit 120 could also be provided on the server of the media source 100. The processing unit 120 comprises a media type detector 121 that detects packet stream sessions associated with encoded videos. It can optionally also collect information about the video codec and profile. This can be used to determine which frame types may be used, e.g. whether B frames can be expected, which prediction structures are used, e.g. whether hierarchical prediction structures may be expected. A thinning unit 122 decides which packet of a packet-switched video stream has to be dropped in case the bandwidth for transmission to the client terminal 180 is not high enough. A maximum packet size detector (MTU) 123 may be optionally provided where the maximum packet size of packets of a video stream is determined. In a simple form, the size of the current investigated packet may be determined and if this size is larger than the size of the preceding packets, a new maximum packet size is determined. As discussed in the introductory part of the description, in case an I frame exceeds the maximum allowed packet size, it is split in more packets where all but the last packet have the maximum allowed packet size. In a first embodiment of the digital video processing unit, the thinning unit 122 will drop the smallest available packet. In a more sophisticated thinning procedure, the maximum packet size provides an additional input for the decision which packet is to be dropped. A GOP structure detector 124 detects the structure of the GOP. In a regular GOP structure, I frames are inserted in the video stream at a fixed temporal distance. A regular GOP structure can be assumed if large packets are observed within fixed distances. The GOP structure detector can also be combined with the MTU detector 123 when packets with the MTU size are considered. As part of a mobile TV service, switching between different TV channels or video streams could occur. In this case, a restart of the GOP structure detector may be necessary. Furthermore, a buffer 125 may be provided storing the packets. In case unit 120 is provided at a proxy, it might be necessary to buffer some of the packets before they are transmitted to the client terminal.

Several methods for thinning the video stream are possible. The methods may be adaptively chosen and combined according to the knowledge of the media type detector which determines the frame types and encoding structure to be expected.

In a first embodiment the thinning unit may be configured in such a way that it simply starts dropping of packets using the packets with the smallest size dropped first. In this embodiment, less important frames like P frames or B frames may be detected. In a hierarchical B frame prediction structure, the B frames with a smaller number of dependent frames should be detected.

Figure 2:
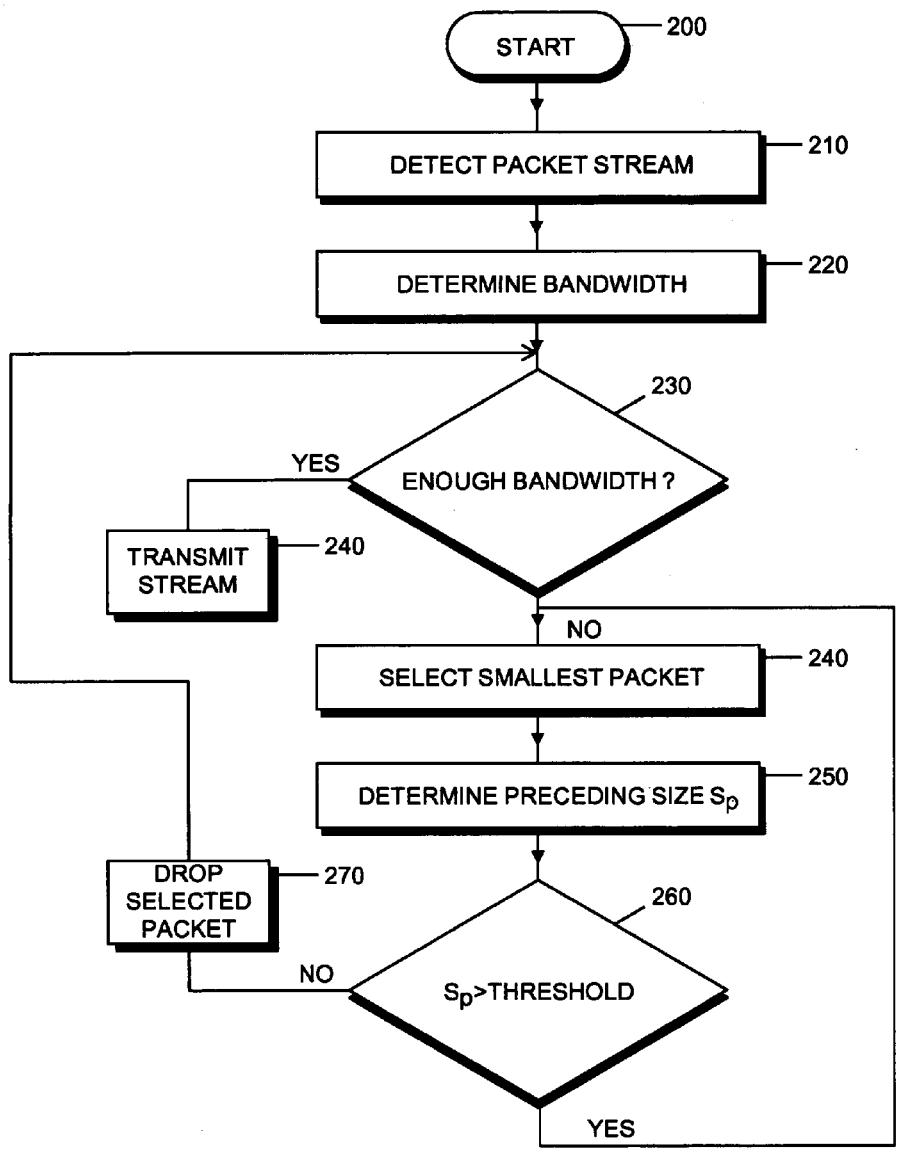
FIG. 2 shows a flowchart with the main steps needed to carry out a thinning of a video stream according to one embodiment of the invention.

In the embodiment of FIG. 2, another method for determining the packets to be dropped is disclosed. After starting the method in step 200 a packet-switched data stream is detected in step 210. If an I frame is now divided into several packets, the last packet of this I frame could be of very small size. In order to prevent the algorithm from dropping this highly important packet, the steps shown in FIG. 2 are proposed. In step 220, the bandwidth provided for streaming the video data is determined and it is asked in step 230 whether the bandwidth is high enough to stream the media file without problems. If this is the case, the streaming is carried out in step 240. If it is, however, detected that not enough bandwidth is provided for streaming the video data, the smallest packet is selected in step 240. In step 250, the size of the preceding packet $S_p$ of the selected smallest packet is determined in step 250. In case of a large preceding packet meaning that the size of the preceding packet $S_p$ is larger than a threshold as determined in step 260 than no dropping is carried out and the next smallest packet is checked by returning to step 240. If the size is not larger than the threshold, it can be deduced that the selected smallest packet is not a part of an I frame so that the selected packet is dropped in step 270 before the method returns to step 230 in order to check how many packets have to be dropped in order to meet the bandwidth constraints.

Another possibility is checking the marker bit in the RTP header. In case the marker bit of the preceding packet is not set and the marker bit in the packet investigated for dropping is set, dropping is not carried out and the next smallest packet is checked.

Figure 3:
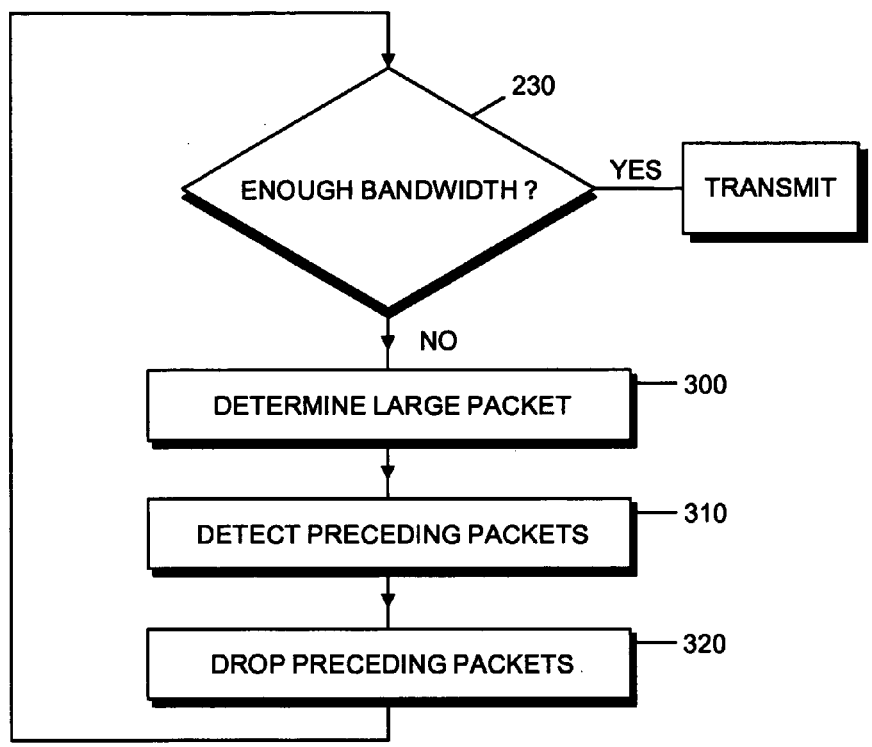
FIG. 3 is a flowchart showing another embodiment for thinning a video stream.

In FIG. 3 another way of selecting a packet to be dropped is shown. This dropping method is based on defining that a packet sent before large packets is dropped. In FIG. 3 the first two steps 200 to 220 correspond to the steps of FIG. 2 and are not shown any more. In the embodiment it is asked again in step 230 whether enough bandwidth is provided for the streaming. If this is not the case, large packets are identified first in step 300. Packets just sent before these large packets are detected in step 310. These packets are then dropped in step 320 in case of insufficient bandwidth. The embodiment shown in FIG. 3 should consider the fact that the importance of a P frame is dependent on its position in a GOP. A P frame just before an I frame is less important than another one appearing earlier in the GOP.

The embodiment shown in FIG. 3 could also be adjusted by using it in connection with the MTU size detector 123 meaning that in addition, the MTU size detector is used for thinning. In this example packets with a size equal to the maximum packet size are identified and packets just before these packets are dropped. In another embodiment, the GOP detector may be used instead of the MTU detector, the GOP detector identifying the position of the I frames. Again, packets just sent before I frames may be dropped first. The different embodiments for thinning a video stream described above could also be combined.

In conclusion, embodiments of the present invention provide an effective way of thinning of encrypted video streams without needing an exact knowledge about the frame type and the position within a GOP. As a consequence, the distortions of the video quality of the streamed video due to dropping packets are minimized.

Figure 4:
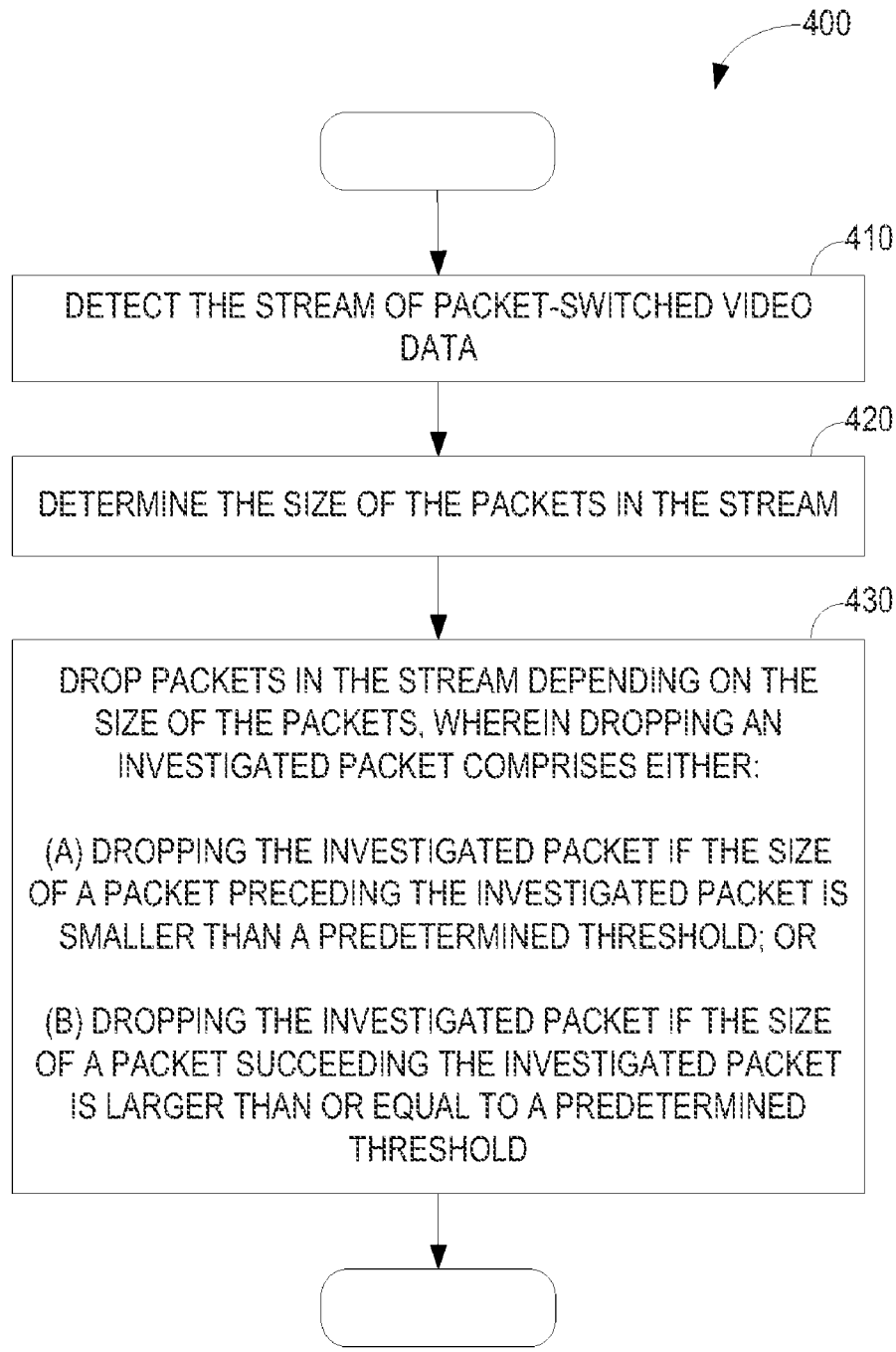
FIG. 4 is a flowchart showing a method for thinning a stream of packet-switched video data according to one or more embodiments.

FIG. 4 shows a method 400 for thinning a stream of packet-switched video data according to one or more embodiments. In step 410, the method 400 comprises detecting the stream of packet-switched video data. In step 420, the method 400 further comprises determining the size of the packets in the stream. In step 430, the method 400 also comprises dropping packets in the stream depending on the size of the packets, wherein dropping an investigated packet comprises either (A) dropping the investigated packet if the size of a packet preceding the investigated packet is smaller than a predetermined threshold; or (B) dropping the investigated packet if the size of a packet succeeding the investigated packet is larger than or equal to a predetermined threshold.

The invention claimed is:

1. A method implemented by a digital video processing unit for thinning a stream of packet-switched video data, the method comprising:
   detecting said stream of packet-switched video data,
   determining, by the digital video processing unit, the size of the packets in the stream, and
   dropping packets in the stream at the digital video processing unit depending on the size of the packets, wherein dropping an investigated packet comprises either:
      dropping the investigated packet if the size of a packet preceding the investigated packet is smaller than a predetermined threshold, or
      dropping the investigated packet if the size of a packet succeeding the investigated packet is larger than or equal to a predetermined threshold.

2. The method according to claim 1, wherein dropping packets comprises dropping a packet with a smallest size first.

3. The method according to claim 2, wherein dropping the investigated packet if the size of a packet preceding the investigated packet is smaller than a predetermined threshold comprises:
   detecting a presence of a marker bit in the packet preceding the investigated packet;
   detecting the presence of the marker bit in the investigated packet, and
   dropping the investigated packet depending on the marker bit set in the preceding and in the investigated packet.

4. The method according to claim 3, wherein dropping the investigated packet depending on the marker bit set in the preceding and in the investigated packet comprises refraining from dropping the investigated packet if:
   the marker bit in the packet preceding the investigated packet is not set, and
   the marker bit in the investigated packet is set.

5. The method according to claim 1, further comprising determining the maximum packet size of the packets in the video stream.

6. The method according to claim 1, wherein the predetermined threshold is the maximum packet size.

7. The method according to claim 1, further comprising determining a frame structure of a Group of Pictures (GOP) contained in the stream of video data.

8. The method according to claim 7, wherein determining the frame structure of a GOP contained in the stream of video data comprises determining said frame structure considering the size of the packets.

9. The method according to claim 8, wherein dropping packets comprises dropping packets also depending on the GOP structure.

10. The method according to claim 1, further comprising detecting the presence of an I frame in a GOP structure, and wherein dropping packets comprises dropping packets preceding an I frame first.

11. The method according to claim 1, further comprising detecting a hierarchical prediction structure for B frames contained in the video stream, and wherein dropping packets comprises dropping the packets taking into account said hierarchical prediction structure.

12. A digital video processing unit for thinning a stream of packet-switched video data, the digital video processing unit comprising:
    a media type detector configured to detect said stream of packet-switched video data, and
    a thinning unit configured to determine which of the packets of the video stream are dropped, by:
        determining the size of the packets in the stream, and
        dropping packets of the stream depending on the size of the packets, the thinning unit configured to drop an investigated packet by either:
            dropping the investigated packet if the size of a packet preceding the investigated packet is smaller than a predetermined threshold, or
            dropping the investigated packet if the size of a packet succeeding the investigated packet is larger than or equal to a predetermined threshold.

13. The digital video processing unit according to claim 12, wherein the thinning unit is configured to drop the smallest packet first.

14. The digital video processing unit according to claim 12, further comprising a maximum packet size detector configured to detect the maximum size of packets in the stream, and wherein the thinning unit is configured to additionally take into account the maximum packet size for determining the packet to be dropped.

15. The digital video processing unit according to claim 12, further comprising a structure detector configured to detect a frame structure of a Group of Pictures (GOP) contained in the stream of video data, and wherein the thinning unit is configured to additionally take into account the GOP structure for determining the packet to be dropped.

* * * * *